United States Patent
Niu et al.

(10) Patent No.: US 11,885,891 B2
(45) Date of Patent: Jan. 30, 2024

(54) COLD START METHOD AND APPARATUS OF A GLOBAL POSITIONING SYSTEM (GPS) MODULE OF A TERMINAL, TERMINAL AND STORAGE MEDIUM

(71) Applicant: ZTE Corporation, Shenzhen (CN)

(72) Inventors: Chao Niu, Shenzhen (CN); Zhaoxin Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 270 days.

(21) Appl. No.: 17/426,679

(22) PCT Filed: Dec. 27, 2019

(86) PCT No.: PCT/CN2019/129199
§ 371 (c)(1),
(2) Date: Jul. 29, 2021

(87) PCT Pub. No.: WO2020/155985
PCT Pub. Date: Aug. 6, 2020

(65) Prior Publication Data
US 2022/0107426 A1   Apr. 7, 2022

(30) Foreign Application Priority Data
Feb. 2, 2019   (CN) .......................... 201910108033.0

(51) Int. Cl.
*G01S 19/25*   (2010.01)
*G01S 19/28*   (2010.01)
*G01S 19/46*   (2010.01)

(52) U.S. Cl.
CPC ............ *G01S 19/258* (2013.01); *G01S 19/28* (2013.01); *G01S 19/46* (2013.01)

(58) Field of Classification Search
CPC ........ G01S 19/258; G01S 19/28; G01S 19/46; G01S 5/0264
See application file for complete search history.

(56) References Cited

U.S. PATENT DOCUMENTS 6,542,819 B1 *  4/2003  Kovacs ................... G01S 5/019
                                                   701/408
6,937,865 B1     8/2005  Bloebaum
(Continued)

FOREIGN PATENT DOCUMENTS

| CN | 1484038 A | 3/2004 |
|---|---|---|
| CN | 101424732 A | 5/2009 |

(Continued)

OTHER PUBLICATIONS

Cariveau, et al., "Satellite Data Management in DOD Navstar GPS Receivers", Navigation into the 21st Century, Kissimmee, Nov. 29, 1988, pp. 134-144, XP000010488.
(Continued)

*Primary Examiner* — Cassi J Galt
(74) *Attorney, Agent, or Firm* — CANTOR COLBURN LLP (57) ABSTRACT

Provided are a cold start method and apparatus of a global positioning system (GPS) module of a terminal, a terminal and a storage medium. The method includes acquiring (S110) target position information of the terminal; selecting (S120), according to the target position information, an ephemeris data record whose position information matches the target position information from a preset satellite visible window table to obtain a target record set; selecting (S130) N satellites according to the ephemeris data record in the target record set to form a visible satellite list, where N is an integer greater than or equal to 4; and positioning (S140) according to the satellites in the visible satellite list.

18 Claims, 4 Drawing Sheets

(56) References Cited

U.S. PATENT DOCUMENTS

| | | |
|---|---|---|
| 7,215,967 B1 | 5/2007 | Kransmo |
| 7,324,045 B2 | 1/2008 | Mo |
| 2004/0192334 A1 | 9/2004 | McBurney |
| 2009/0115657 A1 | 5/2009 | Cheng |
| 2015/0247928 A1 | 9/2015 | Waters |
| 2017/0146660 A1 | 5/2017 | Xu |

FOREIGN PATENT DOCUMENTS

| | | |
|---|---|---|
| CN | 101430375 A | 5/2009 |
| CN | 102636789 A | 8/2012 |
| CN | 101493513 B | 11/2012 |
| CN | 103197327 A | 7/2013 |
| CN | 103376453 A | 10/2013 |
| CN | 105974457 A | 9/2016 |
| CN | 106199654 A | 12/2016 |
| CN | 106680843 A | 5/2017 |
| WO | 0223216 A1 | 3/2002 |

OTHER PUBLICATIONS

European Search Report for corresponding application EP19912686; Report dated Oct. 7, 2022.
Chinese Office Action for corresponding application 201910108033.0; Report dated Apr. 28, 2023.
Chinese Search Report for corresponding application 201910108033.0; Report dated Apr. 27, 2023.
International Search Report for corresponding application PCT/CN2019/129199 filed December Dec. 27, 2019; dated Mar. 19, 2020.

\* cited by examiner

COLD START METHOD AND APPARATUS OF A GLOBAL POSITIONING SYSTEM (GPS) MODULE OF A TERMINAL, TERMINAL AND STORAGE MEDIUM

CROSS-REFERENCE TO RELATED APPLICATIONS

The present application is the United States National Phase application of PCT Application PCT Application No. PCT/CN2019/129199 filed on Dec. 27, 2019, which relates and claims priority to Chinese patent application No. 201910108033.0, filed on Feb. 2, 2019, the entirety of each of which is incorporated herein by reference.

TECHNICAL FIELD

The present disclosure relates to the field of positioning, for example, a cold start method and apparatus of a global positioning system (GPS) module of a terminal, a terminal and a storage medium.

BACKGROUND

The satellite-signal-based positioning and navigation technology is increasingly maturely and widely used in various terminals. Various terminals, such as vehicle-mounted devices and mobile terminals, provided with a GPS module also appear in people's life and work.

A GPS module is started in three modes: cold start, warm start and hot start. In the cold start mode, no ephemeris data and almanac data are pre-stored for any satellite before the start, and complete ephemeris data is acquired before positioning. In the related art, ephemeris data of a certain place at a certain time is acquired in real time during cold start in a manner of satellite-orbit modeling, and a satellite with a strong signal is selected for synchronization. In this cold start mode, the calculation amount is large, a long time is consumed, and positioning usually takes tens of seconds, leading to poor user experience and satisfaction.

SUMMARY

Embodiments of the present disclosure provide a cold start method and apparatus of a global positioning system (GPS) module of a terminal, a terminal and a storage medium, solving the problem in the related art in which a long time is consumed and user experience and satisfaction is poor since ephemeris data is acquired in real time during cold start in a manner of satellite-orbit modeling and a satellite with a strong signal is selected for synchronization.

Embodiments of the present disclosure provide a cold start method of a GPS module of a terminal. The method includes acquiring target position information of the terminal; selecting, from a preset satellite visible window table according to the target position information, an ephemeris data record whose position information matches the target position information to obtain a target record set; selecting N satellites according to the ephemeris data record in the target record set to form a visible satellite list, where N is an integer greater than or equal to 4; and positioning according to the N satellites in the visible satellite list.

Embodiments of the present disclosure further provide a cold start apparatus of a GPS module of a terminal. The apparatus includes a position information acquisition module, a matching module, a selection module and a control module.

The position information acquisition module is configured to acquire target position information of the terminal.

The matching module is configured to select, from a preset satellite visible window table according to the target position information, an ephemeris data record whose position information matches the target position information to obtain a target record set.

The selection module is configured to select N satellites according to the ephemeris data record in the target record set to form a visible satellite list, where N is an integer greater than or equal to 4.

The control module is configured for positioning according to the N satellites in the visible satellite list.

Embodiments of the present disclosure further provide a terminal. The terminal includes a GPS module and further includes a processor, a memory and a communication bus.

The communication bus is configured to connect the processor and the memory.

The processor is configured to execute a computer program stored in the memory to perform the preceding cold start method of a GPS module of a terminal.

Embodiments of the present disclosure further provide a computer-readable storage medium.

The computer-readable storage medium stores one or more computer programs executable by one or more processors so that the preceding cold start method of a GPS module of a terminal is performable.

DETAILED DESCRIPTION

Embodiments of the present disclosure are described in more detail hereinafter in conjunction with drawings and implementations. The embodiments described herein are intended to explain and not to limit the present disclosure.

Embodiment One

Figure 1:
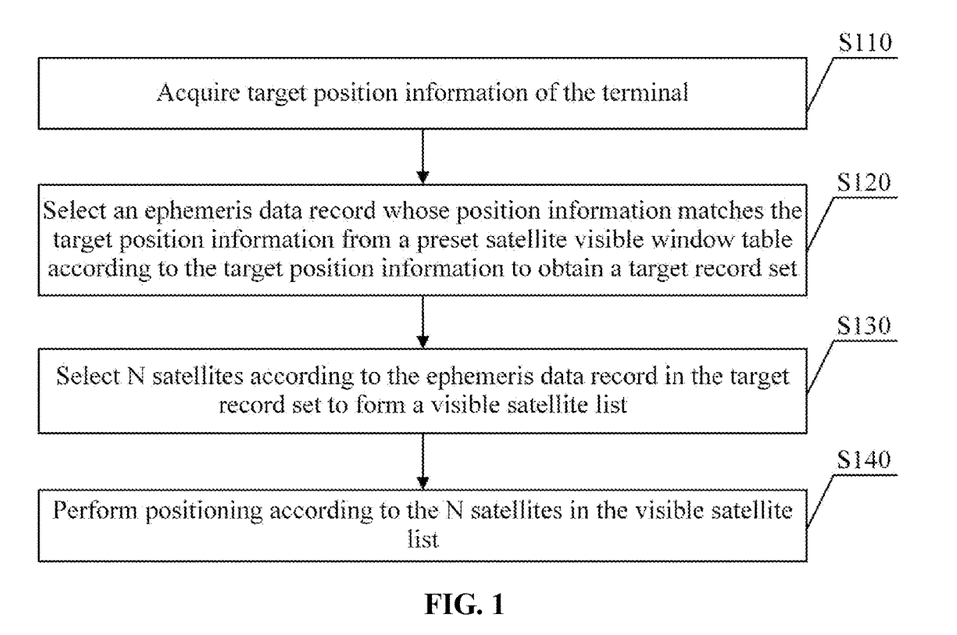
FIG. 1 is a flowchart of a cold start method of a GPS module of a terminal according to embodiment one of the present disclosure.

For the problem in the related art in which a long time is consumed and user experience and satisfaction is poor since ephemeris data is acquired in real time during cold start in a manner of satellite-orbit modeling and a satellite with a strong signal is selected for synchronization, this embodiment provides a cold start method of a GPS module of a terminal. Referring to FIG. 1, the method includes the steps below.

In S110, target position information of the terminal is acquired.

In S120, an ephemeris data record whose position information matches the target position information is selected from a preset satellite visible window table according to the target position information to obtain a target record set.

In S130, N satellites are selected according to the ephemeris data record in the target record set to form a visible satellite list, where N is an integer greater than or equal to 4.

In S140, positioning is performed according to the satellites in the visible satellite list.

The terminal may perform the positioning process by invoking an interface provided by the GPS module based on the visible satellite list.

The terminal of this embodiment may be, but is not limited to, a terminal provided with a GPS module. For example, the terminal may be a mobile terminal such as a smartphone, an iPad, a smartwatch, a ring or a necklace or may be a non-mobile terminal such as a vehicle-mounted terminal having a GPS module or a navigation terminal.

In this embodiment, in S110, the target position information of the terminal may be, but not necessarily, acquired in the following manner: The terminal is positioned in a non-GPS positioning manner to acquire the target position information of the terminal.

The non-GPS positioning manner of this embodiment may be any positioning manner other than GPS positioning, for example, Wireless Fidelity (Wi-Fi) positioning, base station positioning, and hybrid positioning combining Wi-Fi positioning and base station positioning. For example, in a code-division multiple access (CDMA) network, a system message may carry longitude and latitude, and the terminal may acquire the corresponding longitude and latitude from the system message.

Position information of this embodiment may be represented in various manners. In one example, position information may be represented by a grid cell. In one example, the distance of one degree of longitude is calculated using the following formula: $111 \times \cos \theta$ km. In the formula, $\theta$ denotes a latitude value. It can be seen from the formula that one degree of longitude corresponds to about 111 km in an equatorial region, corresponds to less than 111 km in a non-equatorial region and approaches 0 in a polar region. Moreover, the movement distance threshold for classifying GPS cold start and GPS hot start may be 200 km; therefore, in this example, two degrees may be selected as the accuracy of longitude and latitude. The surface of the Earth is divided into multiple grid cells by a granularity of two degrees from longitude 0 and latitude 0. These grid cells are numbered differently. In this manner, position information represented by particular longitude and latitude is mapped to the corresponding grid cell and represented by the serial number of this grid cell. In this example, the target position information obtained by positioning the terminal in the non-GPS positioning manner may be mapped to the corresponding grid cell and represented by the serial number of this grid cell.

In another example of this embodiment, the target position information of the terminal may be acquired in another manner. For example, the target position information may be default position information. The default position information is externally input (for example, input by a terminal user on a corresponding interface) position information received by the terminal, or the default position information is position information that is acquired in a positioning process after the GPS module is hot-started and that satisfies a preset condition.

For example, in one application scenario, the terminal may provide a position information input interface in real time. For example, on the display interface, the terminal may display a corresponding interface for user input. The terminal may use position information that is input by the user in real time or that is pre-input as the default position information.

For another example, in another application scenario, the terminal may use position information that is acquired in a positioning process after the GPS module is hot-started and that satisfies a preset condition as the default position information. For example, the terminal may periodically collect statistics on position coordinates after the GPS module is hot-started and then determine, by mapping, the grid cell where the terminal is located. After statistics on position information are collected for a period of time, one piece of position information satisfying the preset condition is used as the default position information. In one example, the preset condition may include position information that is most frequently positioned during a preset time period, that is, the hottest position information that is positioned.

Optionally, in some examples of this embodiment, when a relatively large change in the position of the terminal is detected, for example, when a long-distance migration (for example, cross-province movement of the user) is detected, the terminal may trigger a new process of determining the default position in the preceding manner or in another manner. The preceding process may also be referred to as a default-position learning process.

Figure 2:
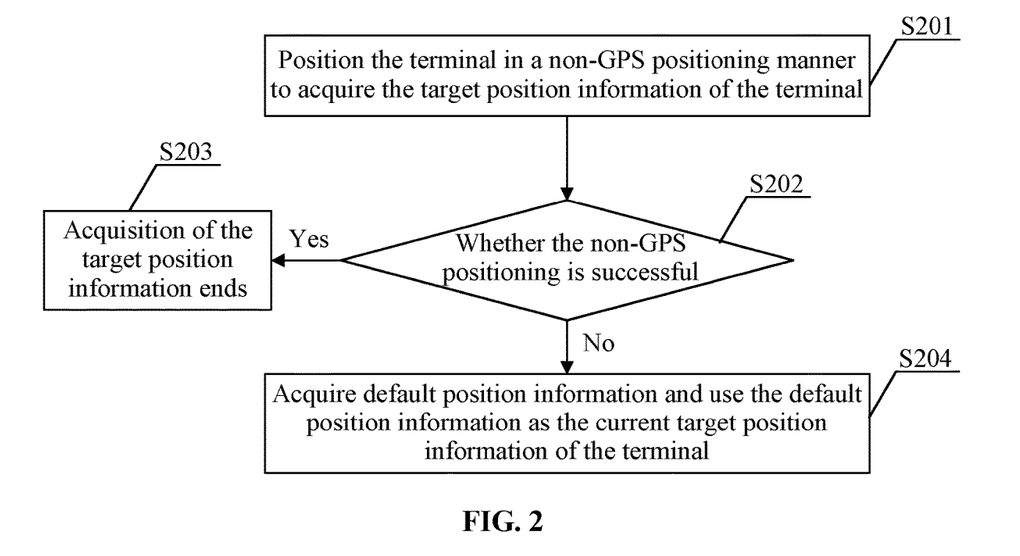
FIG. 2 is a flowchart of acquiring the current target position information of the terminal according to embodiment one of the present disclosure.

In another example of this embodiment, the target position information of the terminal may also be acquired using the process shown in FIG. 2.

In S201, the terminal is positioned in a non-GPS positioning manner to acquire the target position information of the terminal.

In S202, it is determined whether the non-GPS positioning is successful; if yes, the process goes to S203; otherwise, the process goes to S204.

In S203, acquisition of the target position information ends.

In S204, default position information is acquired and used as the current target position information of the terminal.

In this embodiment, the ephemeris data record in the satellite visible window table may include an ephemeris data record converted by the terminal according to ephemeris data periodically acquired from a server. The server may be, but is not limited to, an assisted global positioning system (A-GPS) server. In this embodiment, the period in which the terminal acquires the ephemeris data from the server may be flexibly set, for example, the terminal may acquire the ephemeris data periodically from the server at flexibly set intervals within a period of time (for example, 24 hours or other periods of time). In one example, the period may be 20 minutes (or minutes or 10 minutes). (Too short period leads to higher power consumption of the terminal while too long period leads to failure to establish an effective satellite visible window table.) After periodically acquiring the ephemeris data from the AGPS server, the terminal may convert the received multiple pieces of ephemeris data into ephemeris data records and insert the ephemeris data records into the satellite visible window table. For example, if a satellite has a visible time of three hours and a sampling rate of 20-minute intervals, 3*60/20 ephemeris data records are generated for this satellite. The same goes to other satellites.

In one example of this embodiment, the format of the ephemeris data record may include the following fields: position information (which may be, for example, represented by, but not necessarily by, a grid cell number), a satellite number, a satellite elevation angle and a record timestamp. The position information (grid cell number) is information about a position where the positioning terminal generating the ephemeris data record is located (that is, the serial number of the grid cell where the positioning terminal is located) when the ephemeris data record is generated. The satellite number is the unique identifier of a satellite in the GPS system. The satellite elevation angle is an angle between the horizontal plane and the direction line from the positioning terminal to the satellite. The record timestamp is the time when the ephemeris data record is generated, for example, year, month, day, hour, minute, second.

In other examples of this embodiment, the ephemeris data record in the satellite visible window table may be downloaded from the server. In this case, ephemeris data records on the server may be generated by other terminals (including the present positioning terminal) and then sent by these terminals to the server. The terminal may download an ephemeris data record from the server when the ephemeris data record is needed. In some examples, to implement this function, it is feasible to define a download interaction interface between the server and the positioning terminal. The server may be an AGPS server. In this acquisition manner, ephemeris data records of all grid cells of a certain place can be downloaded. In some examples, ephemeris data records may be acquired by combining the preceding two manners.

In some examples of this embodiment, the target position information acquired in S110 may further include the current target time of the terminal.

The N satellites are selected in the manner below according to the ephemeris data record in the target record set in S120 to form a visible satellite list in S130. See FIG. 3.

Figure 3:
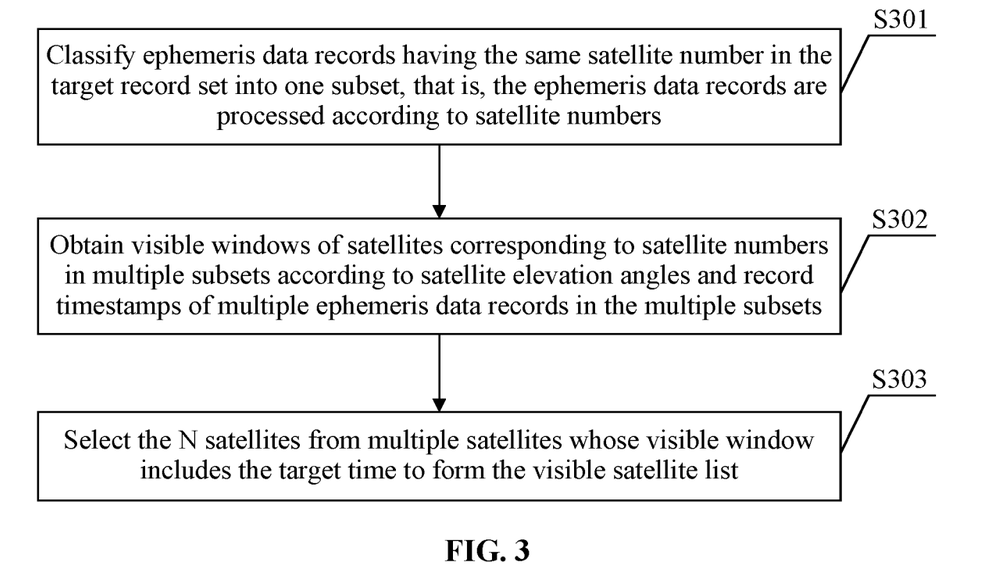
FIG. 3 is a flowchart of selecting N satellites to form a visible satellite list according to embodiment one of the present disclosure.

In S301, ephemeris data records having the same satellite number in the target record set are classified into one subset, that is, the ephemeris data records are processed according to satellite numbers.

In S302, visible windows of satellites corresponding to satellite numbers in multiple subsets are obtained according to satellite elevation angles and record timestamps of multiple ephemeris data records in the multiple subsets, where each visible window is determined by start and end time during which the satellite elevation angle is greater than a cut-off angle. In one embodiment, the value of the cut-off angle may be flexibly set to, for example, 15° or another value.

In S303, the N satellites are selected from multiple satellites whose visible window includes the target time of the terminal to form the visible satellite list. The value of N may be set flexibly, for example, 4, 5 or 6.

Additionally, in some examples of this embodiment, when the number of ephemeris data records in the target record set is empty or when the number of ephemeris data records is less than or equal to a set value (for example, 4), the GPS module may be cold-started in another cold start mode in the related art.

In some examples of this embodiment, the N satellites are selected in the manner below from multiple satellites whose visible window includes the target time of the terminal to form the visible satellite list in S303.

The N satellites are selected, in descending order of satellite elevation angles in visible windows, from the multiple satellites whose visible window includes the current target time of the terminal to form the visible satellite list. The selection rule is not limited to selection in descending order of satellite elevation angles. Another selection rule may also be used, for example, selection in order or selection according to satellite signal strength.

In some examples of this embodiment, the visible windows of the satellites corresponding to the satellite numbers in the subsets are obtained according to the satellite elevation angles and the record timestamps of the ephemeris data records in the subsets in S302 in the manner below.

For each subset, a record timestamp in a first ephemeris data record that includes a satellite elevation angle greater than the cut-off angle and that is included in the each subset and a record timestamp in a second ephemeris data record that includes a satellite elevation angle greater than the cut-off angle and that is included in the each subset are used as original start time and original end time respectively in time order; and the original start time and the original end time may be used as the start time and the end time of a visible window respectively.

Figure 4:
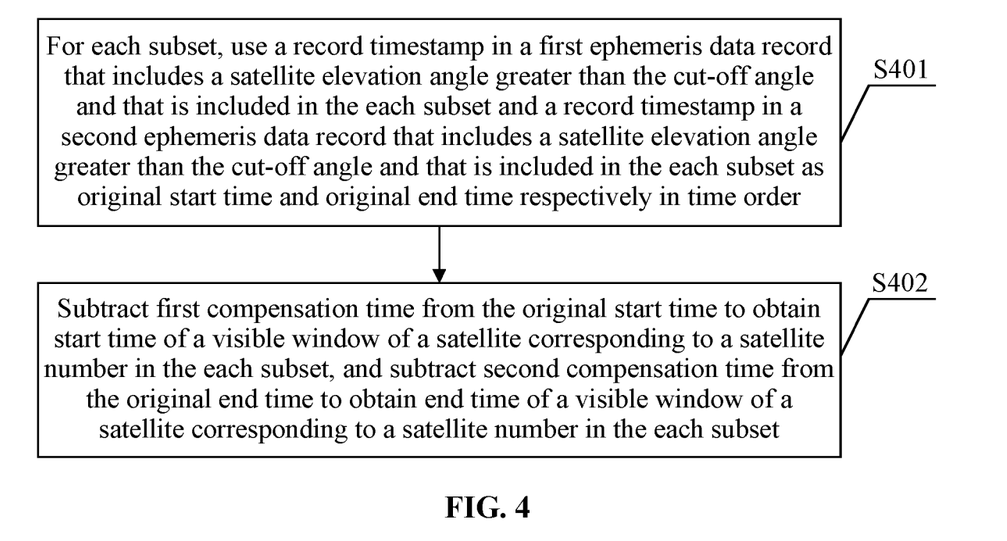
FIG. 4 is a flowchart of obtaining visible windows of satellites corresponding to satellite numbers in multiple subsets according to embodiment one of the present disclosure.

In other examples of this embodiment, in view that a GPS satellite spends 11 hours and 58 minutes running for one round, a 2-minute time drift occurs every half day (12 hours). Therefore, in this embodiment, the start and end time of a visible window may be modified so that the control accuracy is improved. The visible windows of the satellites corresponding to the satellite numbers in the multiple subsets are obtained according to the satellite elevation angles and the record timestamps of the multiple ephemeris data records in the multiple subsets in the manner below.

In S401, for each subset, a record timestamp in a first ephemeris data record that includes a satellite elevation angle greater than the cut-off angle and that is included in the each subset and a record timestamp in a second ephemeris data record that includes a satellite elevation angle greater than the cut-off angle and that is included in the each subset are used as original start time and original end time respectively in time order.

In S402, first compensation time is subtracted from the original start time so that start time of a visible window of a satellite corresponding to a satellite number in the each subset is obtained, and second compensation time is subtracted from the original end time so that end time of a visible window of a satellite corresponding to a satellite number in the each subset is obtained.

The first compensation time is 2 minutes*a first record entry half-day age value. The first record entry half-day age value is a value obtained by rounding a value that is obtained by dividing a difference between the record timestamp in the first ephemeris data record and the target time of the terminal by 12 hours. The rounding may be rounding up or rounding down according to requirements.

The second compensation time is 2 minutes*a second record entry half-day age value. The second record entry half-day age value is a value obtained by rounding a value that is obtained by dividing a difference between the record timestamp in the second ephemeris data record and the target time of the terminal by 12 hours. The rounding may also be rounding up or rounding down.

Optionally, in some examples of this embodiment, in order that the usability and practicality of the ephemeris data record and the success rate of cold start are improved, the ephemeris data record may further include a failure count value. The failure count value records the number of failures recorded by the positioning terminal by using the ephemeris data record. The counting is performed by a failure counter. Therefore, in this embodiment, after positioning is performed according to the satellites in the visible satellite list in S140, the method may further include the steps below.

In response to successful positioning, for an ephemeris data record that corresponds to each satellite of the N satellites in the target record set and that has a current value greater than 0, 1 is subtracted from the failure count value.

In response to failed positioning, for an ephemeris data record that corresponds to each satellite of the N satellites in the target record set, 1 is added to the failure count value. Optionally, in response to failed positioning, the GPS module may be cold-started in any other cold start mode in the related art.

Optionally, in this embodiment, the method may further include clearing an ephemeris data record whose failure count value is greater than a preset count threshold (which may be flexibly set to 3, 4 or 5) from the satellite visible window table. Optionally, after the clearing, the terminal may acquire a corresponding ephemeris data record in the preceding manner or in another manner. That is, the terminal may relearn the ephemeris data record.

In this embodiment, in the cold start method of a GPS module, N satellites are selected according to the preset satellite visible window table including ephemeris data records and according to the current target position information and target time information of the positioning terminal to form the visible satellite list, and positioning is performed according to the satellites in the visible satellite list. Compared with the related art in which ephemeris data is acquired in real time during cold start in a manner of satellite-orbit modeling, the method of the present disclosure can shorten the cold start time of the GPS module to less than 10 seconds according to tests. This time is substantially equal to the time required for the hot start of the GPS module, greatly shortening the cold start time of the GPS module, reducing the calculation complexity and improving user experience and satisfaction.

Embodiment Two

Figure 5:
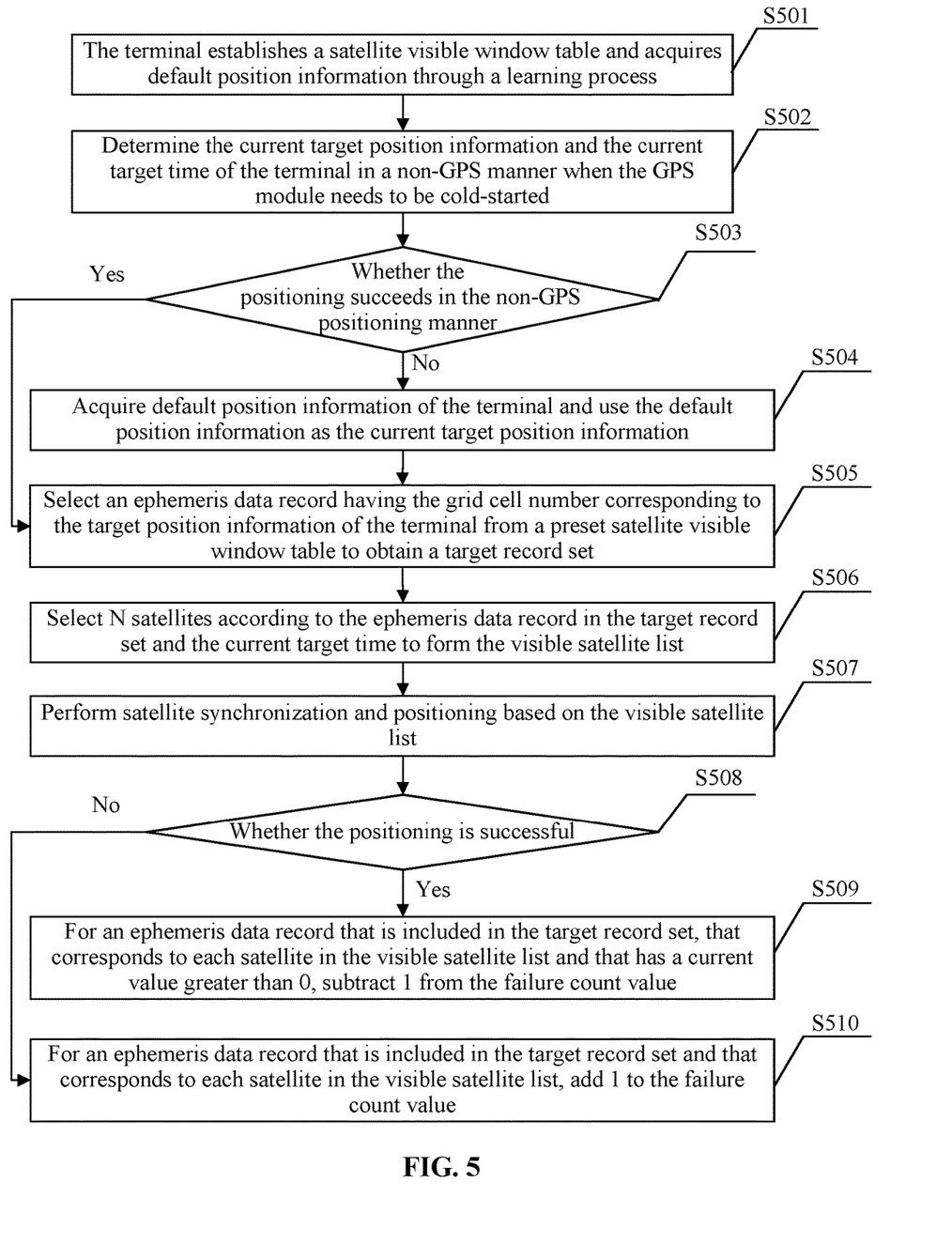
FIG. 5 is a flowchart of a cold start method of a GPS module of a terminal according to embodiment two of the present disclosure.

In this embodiment, for ease of understanding, a cold start process of a GPS module of a terminal is described using an example of a mobile terminal provided with a GPS module. Referring to FIG. 5, the process includes the steps below.

In S501, the terminal establishes a satellite visible window table and acquires default position information through a learning process.

The learning process of this example includes two targets. The first target is to acquire default position information. The second target is to establish a satellite visible window table.

In this example, the first target may be achieved in the manner below or in another manner.

Position coordinates that are collected periodically by the terminal after the GPS module is hot-started and that satisfy a preset condition are used as default information. The gird cell where the collected position coordinates are located is determined and is hereinafter referred to as the default position grid cell. Optionally, a user may manually set the default position on a user interface (UI) and map the default position to the corresponding grid cell.

In this example, a learning process based on a new default position may be triggered after it is detected that the terminal has migrated a long distance.

In this example, the second target may be achieved in the manner below or in another manner.

The terminal communicates with an AGPS server periodically at flexibly set intervals within a period of time (24 hours). The period may be 20 minutes (or 15 minutes or 10 minutes). Too short period leads to higher power consumption of the terminal while too long period leads to failure to establish an effective satellite visible window table. After periodically acquiring the ephemeris data from the AGPS server, the terminal may convert the received multiple pieces of ephemeris data into ephemeris data records and insert the ephemeris data records into the satellite visible window table. In this example, the format of the ephemeris data record may include the following fields: a grid cell number (that is, position information), a satellite number, a satellite elevation angle, a failure counter and a record timestamp. The grid cell number is the serial number of the grid cell where the positioning terminal is located when the ephemeris data record is generated. The satellite number is the unique identifier of a satellite in the GPS system. The satellite elevation angle is an angle between the horizontal plane and the direction line from the positioning terminal to the satellite. The failure counter records the number of failures recorded by the positioning terminal by using the ephemeris data record. The record timestamp is the year, month, day, hour, minute and second when the ephemeris data record is generated.

As can be seen from the preceding analysis, in some examples, the terminal may also download all ephemeris data record entries from a network server.

S501 may not necessarily be performed in conjunction with subsequent steps. S501 may be performed at any time before the cold start, for example, a period of time in which the GPS module is hot-started.

In S502, the current target position information and the current target time of the terminal are determined in a non-GPS manner when the GPS module needs to be cold-started.

The non-GPS positioning manner of this embodiment may be any positioning manner other than GPS positioning, for example, a mobile cellular network or a Wi-Fi network. After the positioning succeeds in the non-GPS positioning manner, the acquired position is mapped to the corresponding grid cell so that the corresponding grid cell number is acquired.

In S503, it is determined whether the positioning succeeds in the non-GPS positioning manner; if no, the process goes to S504; otherwise, the process goes to S505.

In S504, default position information of the terminal is acquired and used as the current target position information, and then the process goes to S505.

In S505, an ephemeris data record having the grid cell number corresponding to the target position information of the terminal (or having a grid cell number adjacent to the preceding grid cell number) is selected from a preset satellite visible window table to obtain a target record set.

The satellite visible window table of this example may contain sampled data of all 24 (or 28) satellites in the GPS system.

In S506, N satellites are selected according to the ephemeris data record in the target record set and the current target time of the terminal to form the visible satellite list.

In this example, it is feasible to sort ephemeris data records in the target record set according to satellite numbers, calculate the visible window of each satellite, that is, the intra-day start and end time greater than a cut-off angle (which may be 15° in this example), and select, in descending order of satellite elevation angles in visible windows covering the current target time of the terminal (That is, the intra-day time includes the current time. For example, the intra-day start and end time of a certain visible window is from 9:00 a.m. to 12:00 noon and the intra-day time corresponding to the target time of the terminal is 10:00 a.m., then the visible window covers the target time of the terminal.), 4 (or 5 or 6) satellites from the satellites whose visible window includes the current target time of the terminal to form the visible satellite list.

In this example, compensation processing may be performed on the start and end time of the visible window in the preceding compensation manner.

In S507, satellite synchronization and positioning are performed based on the visible satellite list.

In this example, positioning is performed based on the visible satellite list by using an interface provided by the GPS module.

In S508, it is determined whether the positioning is successful; if yes, the process goes to S509; otherwise, the process goes to S510.

In S509, for an ephemeris data record that is included in the target record set, that corresponds to each satellite in the visible satellite list and that has a current value greater than 0, 1 is subtracted from the failure count value.

In S510, for an ephemeris data record that is included in the target record set and that corresponds to each satellite in the visible satellite list, 1 is added to the failure count value.

In this example, it is also feasible to delete and process an ephemeris data record whose failure count value is greater than or equal to 3 and trigger a relearning process. Additionally, in this example, it is also feasible to enter another cold start process by using the interface provided by the GPS module in S510.

Embodiment Three

Figure 6:
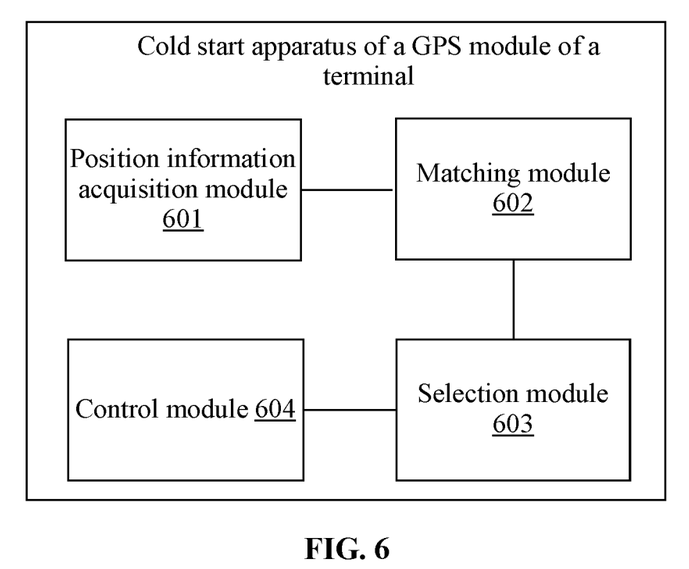
FIG. 6 is a diagram illustrating the structure of a cold start apparatus of a GPS module of a terminal according to embodiment three of the present disclosure.

This embodiment provides a cold start apparatus of a GPS module of a terminal. The apparatus is applicable to diverse terminals having a GPS module. As shown in FIG. 6, the apparatus includes a position information acquisition module 601, a matching module 602, a selection module 603 and a control module 604.

The position information acquisition module 601 is configured to acquire target position information of the terminal. In this embodiment, the position information acquisition module 601 may acquire the current target position information of the terminal in a non-GPS positioning manner or in another positioning manner. The non-GPS positioning manner of this embodiment may be any positioning manner other than GPS positioning, for example, Wi-Fi positioning, base station positioning, and hybrid positioning combining Wi-Fi positioning and base station positioning.

Position information of this embodiment may be represented in various manners. In one example, position information may be represented by a grid cell.

In another example of this embodiment, the current target position information of the terminal may be acquired in another manner. For example, the target position information may be default position information. The default position information is externally input position information received by the terminal, or the default position information is position information that is acquired in a positioning process after the GPS module is hot-started and that satisfies a preset condition.

For another example, in another application scenario, the position information acquisition module 601 may be configured to use position information that is acquired in a positioning process after the GPS module is hot-started and that satisfies a preset condition as the default position information.

Optionally, in some examples of this embodiment, when the position information acquisition module 601 detects a relatively large change in the position of the terminal, for example, when the position information acquisition module 601 detects a long-distance migration, the position information acquisition module 601 may trigger a new process of determining the default position in the preceding manner or in another manner. The position information acquisition module 601 may acquire the current target position information of the terminal by combining the preceding two manners.

The matching module 602 is configured to select, according to the target position information acquired by the position information acquisition module 601, an ephemeris data record whose position information matches the target position information from a preset satellite visible window table to obtain a target record set.

In this embodiment, the ephemeris data record in the satellite visible window table may include an ephemeris data record converted by the terminal according to ephemeris data periodically acquired from a server. The server may be, but is not limited to, an AGPS server. In one example of this embodiment, the format of the ephemeris data record may include the following fields: position information (which may be, for example, represented by, but not necessarily by, a grid cell number), a satellite number, a satellite elevation angle and a record timestamp. In other examples of this embodiment, the ephemeris data record in the satellite visible window table may include an ephemeris data record downloaded by the terminal from the server. In this case, ephemeris data records on the server may be generated by other terminals (including the present positioning terminal) and then sent by these terminals to the server. The terminal may download an ephemeris data record from the server when the ephemeris data record is needed.

The selection module 603 is configured to select N satellites according to the ephemeris data record in the target record set to form a visible satellite list. The target record set is determined by the matching module 602. N is an integer greater than or equal to 4, for example, 4, 5 or 6. In some examples of this embodiment, the current target position information acquired by the position information acquisition module 601 may further include the current target time of the terminal. The selection module 603 may select, in the manner below, the N satellites according to the ephemeris data record in the target record set to form a visible satellite list.

The selection module 603 is configured to classify ephemeris data records having the same satellite number in the target record set into one subset, that is, process the ephemeris data records according to satellite numbers; and obtain visible windows of satellites corresponding to satellite numbers in multiple subsets according to satellite elevation angles and record timestamps of multiple ephemeris data records in the subsets, where each visible window is determined by start and end time during which the satellite elevation angle is greater than a cut-off angle. The value of the cut-off angle may be flexibly set to, for example, 15° or another value. Then the selection module 603 is configured to select the N satellites from multiple satellites whose visible window includes the target time of the terminal to form the visible satellite list.

The value of N may be set flexibly, for example, 4, 5 or 6.

Additionally, in some examples of this embodiment, when the number of ephemeris data records in the target record set is empty or when the number of ephemeris data records is less than or equal to a set value, for example, 4, the GPS module may be cold-started in another cold start mode in the related art.

In one example, the selection module 603 may be configured to select, in descending order of satellite elevation angles in visible windows, the N satellites from the satellites whose visible window includes the target time of the terminal to form the visible satellite list. The selection rule is not limited to selection in descending order of satellite elevation angles. Another selection rule may also be used, for example, selection in order or selection according to satellite signal strength.

In some examples of this embodiment, the selection module 603 is configured to obtain the visible windows of the satellites corresponding to the satellite numbers in the subsets according to the satellite elevation angles and the record timestamps of the ephemeris data records in the subsets in the manner below.

For each subset, the selection module 603 uses a record timestamp in a first ephemeris data record that includes a satellite elevation angle greater than the cut-off angle and that is included in the each subset and a record timestamp in a second ephemeris data record that includes a satellite elevation angle greater than the cut-off angle and that is included in the each subset as original start time and original end time respectively in time order; and may use the original start time and the original end time as the start time and the end time of a visible window respectively.

In other examples of this embodiment, in view that a GPS satellite spends 11 hours and 58 minutes running for one round, a 2-minute time drift occurs every half day (12 hours). Therefore, in this embodiment, the selection module 603 may modify the start and end time of a visible window to improve the control accuracy. The modification manner may be, but is not limited to, the preceding manner.

The control module 604 is configured for positioning according to the satellites in the visible satellite list. More specifically, the control module 604 may be configured for positioning by invoking an interface provided by the GPS module based on the visible satellite list.

The functions of the preceding modules may be implemented by, but not necessarily by, a processor or a controller in the terminal.

Optionally, in some examples of this embodiment, in order that the usability and practicality of the ephemeris data record and the success rate of cold start are improved, the ephemeris data record may further include a failure count value. The failure count value records the number of failures recorded by the positioning terminal by using the ephemeris data record. The counting is performed by a failure counter. Therefore, in this embodiment, after the control module 604 performs positioning according to the satellites in the visible satellite list, the control module 604 is further configured to, in response to successful positioning, for an ephemeris data record that corresponds to each satellite of the N satellites in the target record set and that has a current value greater than 0, subtract 1 from the failure count value; and, in response to failed positioning, for an ephemeris data record that corresponds to each satellite of the N satellites in the target record set, add 1 to the failure count value. Optionally, in response to failed positioning, the GPS module may be cold-started in any other cold start mode in the related art.

Optionally, in this embodiment, the control module 604 may be further configured to clear an ephemeris data record whose failure count value is greater than a preset count threshold (which may be flexibly set to 3, 4 or 5) from the satellite visible window table. Optionally, after the clearing, the terminal may acquire a corresponding ephemeris data record in the preceding manner or in another manner. That is, the terminal may relearn the ephemeris data record.

In this embodiment, the cold start apparatus of a GPS module selects N satellites according to the preset satellite visible window table including ephemeris data records and according to the current target position information and target time information of the positioning terminal to form the visible satellite list and performs positioning according to the satellites in the visible satellite list. In this manner, the cold start time of the GPS module is greatly shortened, the calculation complexity is reduced, and user experience and satisfaction is improved.

Embodiment Four

Figure 7:
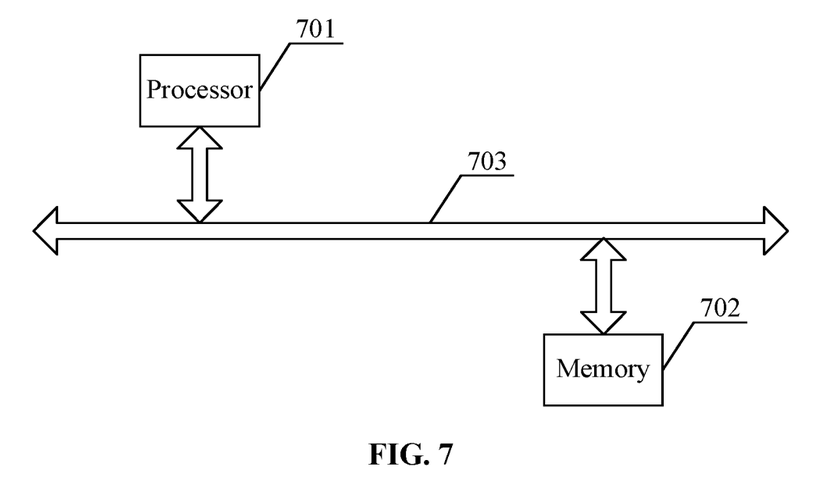
FIG. 7 is a diagram illustrating the structure of a terminal according to embodiment four of the present disclosure.

This embodiment provides a terminal. The terminal may be, but is not limited to, a terminal provided with a GPS module. For example, the terminal may be a mobile terminal such as a smartphone, an iPad, a smartwatch, a ring or a necklace or may be a non-mobile terminal such as a vehicle-mounted terminal having a GPS module or a navigation terminal. Referring to FIG. 7, the terminal further includes a processor 701, a memory 702 and a communication bus 703.

The communication bus 703 is configured to enable communicative connection between the processor 701 and the memory 702.

In one example, the processor 701 may be configured to execute one or more computer programs stored in the memory 702 to perform the steps of the cold start method of a GPS module of a terminal according to any preceding embodiment.

This embodiment provides a computer-readable storage medium. The computer-readable storage medium includes a volatile or non-volatile medium or a removable or non-removable medium implemented in any method or technology for storing information (such as computer-readable instructions, data structures, computer program modules or other data). The computer-readable storage medium may be, but is not limited to, a random-access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk or another magnetic storage device, or any other medium for storing desired information that can be accessed by a computer.

In one example, the computer-readable storage medium of this embodiment may be configured to store one or more computer programs executable by one or more processors so that the steps of the cold start method of a GPS module of a terminal according to any preceding embodiment are performable.

This embodiment provides a computer program (or computer software). The computer program may be distributed in a computer-readable medium and executed by a computing device to implement at least one step of the cold start method of a GPS module of a terminal according to any preceding embodiment. Moreover, in some cases, the illustrated or described at least one step may be performed in a sequence different from the sequence described in any preceding embodiment.

This embodiment provides a computer program product. The computer program product includes a computer-readable apparatus that stores the preceding computer program.

In this embodiment, the computer-readable apparatus may include the preceding computer-readable storage medium.

Some or all steps of the preceding method and function modules/units in the preceding system or apparatus may be implemented as software (which may be implemented by computer program codes executable by a computing device), firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present disclosure is not limited to any particular combination of hardware and software.

In the cold start method and apparatus of a GPS module of a terminal, a terminal and a storage medium according to embodiments of the present disclosure, the method includes acquiring target position information of the terminal; selecting, according to the target position information, an ephemeris data record whose position information matches the target position information from a preset satellite visible window table to obtain a target record set; selecting N satellites according to the ephemeris data record in the target record set to form a visible satellite list, where N is an integer greater than or equal to 4; and positioning according to the satellites in the visible satellite list. Compared with the related art in which ephemeris data is acquired in real time during cold start in a manner of satellite-orbit modeling, the method of the present disclosure can shorten the cold start time of the GPS module to less than 10 seconds according to tests. This time is substantially equal to the time required for the hot start of the GPS module, greatly improving user experience and satisfaction.

What is claimed is:

1. A cold start method of a global positioning system (GPS) module of a terminal, comprising:
   acquiring target position information of the terminal;
   selecting, from a preset satellite visible window table and according to the target position information, an ephemeris data record whose position information matches the target position information to obtain a target record set;
   selecting N satellites according to the ephemeris data record in the target record set to form a visible satellite list, wherein N is an integer greater than or equal to 4;
   positioning according to the N satellites in the visible satellite list;
   wherein the ephemeris data record in the satellite visible window table comprises ephemeris data directly downloaded by the terminal from a server or an ephemeris data converted by the terminal according to ephemeris data periodically acquired from the server; and
   the ephemeris data record further comprises a satellite number, a satellite elevation angle and a record timestamp, wherein the position information of the ephemeris data record is information about a position where a terminal generating the ephemeris data record is located when the ephemeris data record is generated, and the record timestamp is time when the ephemeris data record is generated.

2. The method of claim 1, wherein acquiring the target position information of the terminal comprises:
   positioning the terminal in a non-GPS positioning manner to acquire the target position information of the terminal.

3. The method of claim 2, wherein acquiring the target position information of the terminal further comprises:
   in response to failing to position the terminal in the non-GPS positioning manner, acquiring default position information and using the default position information as the target position information of the terminal, wherein
   the default position information is externally input position information received by the terminal, or the default position information is position information that is acquired in a positioning process after the GPS module is hot-started and that satisfies a preset condition.

4. The method of claim 3, wherein the preset condition comprises position information that is most frequently positioned during a preset time period.

5. The method of claim 1, wherein
   the method further comprises acquiring a current target time of the terminal in response to acquiring the target position information of the terminal, and
   selecting the N satellites according to the ephemeris data record in the target record set to form the visible satellite list comprises:
   classifying ephemeris data records having a same satellite number in the target record set into a subset;
   obtaining visible windows of satellites corresponding to satellite numbers in a plurality of subsets according to satellite elevation angles and record timestamps of a plurality of ephemeris data records in the plurality of subsets, wherein each of the visible windows is determined by start time and end time during which the satellite elevation angle is greater than a cut-off angle; and
   selecting the N satellites from a plurality of satellites to form the visible satellite list, wherein a visible window corresponding to each of the plurality of satellites comprises the target time of the terminal.

6. The method of claim 5, wherein selecting the N satellites from the plurality of satellites to form the visible satellite list comprises:
   selecting, in descending order of satellite elevation angles in visible windows comprising the target time of the terminal, the N satellites from the plurality of satellites to form the visible satellite list.

7. The method of claim 5, wherein obtaining the visible windows of the satellites corresponding to the satellite numbers in the plurality of subsets according to the satellite elevation angles and the record timestamps of the plurality of ephemeris data records in the plurality of subsets comprises:
   for each subset, using a record timestamp in a first ephemeris data record that comprises a satellite elevation angle greater than the cut-off angle and that is comprised in the each subset as original start time in time order, and using a record timestamp in a second ephemeris data record that comprises a satellite elevation angle greater than the cut-off angle and that is comprised in the each subset as original end time in the time order; and subtracting first compensation time from the original start time to obtain start time of a visible window of a satellite corresponding to a satellite number in the each subset and subtracting second compensation time from the original end time to obtain end time of the visible window of the satellite corresponding to the satellite number in the each subset, wherein the first compensation time is 2 minutes*a first record entry half-day age value, wherein the first record entry half-day age value is a value obtained by rounding a value that is obtained by dividing a difference between the record timestamp in the first ephemeris data record and the target time of the terminal by 12 hours; and the second compensation time is 2 minutes*a second record entry half-day age value, wherein the second record entry half-day age value is a value obtained by rounding a value that is obtained by dividing a difference between the record timestamp in the second ephemeris data record and the target time of the terminal by 12 hours.

8. The method of claim 1, wherein
the ephemeris data record further comprises a failure count value; and
after positioning according to the satellites in the visible satellite list, the method further comprises:
in response to successful positioning, for an ephemeris data record that corresponds to each satellite of the N satellites in the target record set and that has a current value greater than 0, subtracting 1 from the failure count value; and
in response to failed positioning, for an ephemeris data record that corresponds to each satellite of the N satellites in the target record set, adding 1 to the failure count value.

9. The method of claim 8, further comprising:
clearing an ephemeris data record whose failure count value is greater than a preset count threshold from the satellite visible window table.

10. A terminal, comprising a global positioning system (GPS) module and further comprising a processor, a memory and a communication bus, wherein
the communication bus is configured to connect the processor and the memory; and
the processor is configured to execute a computer program stored in the memory to perform:
acquiring target position information of the terminal;
selecting, from a preset satellite visible window table and according to the target position information, an ephemeris data record whose position information matches the target position information to obtain a target record set;
selecting N satellites according to the ephemeris data record in the target record set to form a visible satellite list, wherein N is an integer greater than or equal to 4;
positioning according to the N satellites in the visible satellite list;
wherein the ephemeris data record in the satellite visible window table comprises ephemeris data directly downloaded by the terminal from a server or an ephemeris data converted by the terminal according to ephemeris data periodically acquired from the server; and
the ephemeris data record further comprises a satellite number, a satellite elevation angle and a record timestamp, wherein the position information of the ephemeris data record is information about a position where a terminal generating the ephemeris data record is located when the ephemeris data record is generated, and the record timestamp is time when the ephemeris data record is generated.

11. A non-transitory computer-readable storage medium, the computer-readable storage medium storing one or more computer programs and one more processor which execute the one or more computer programs to perform:
acquiring target position information of a terminal;
selecting, from a preset satellite visible window table and according to the target position information, an ephemeris data record whose position information matches the target position information to obtain a target record set;
selecting N satellites according to the ephemeris data record in the target record set to form a visible satellite list, wherein N is an integer greater than or equal to 4;
positioning according to the N satellites in the visible satellite list;
wherein the ephemeris data record in the satellite visible window table comprises ephemeris data directly downloaded by the terminal from a server or an ephemeris data converted by the terminal according to ephemeris data periodically acquired from the server; and
the ephemeris data record further comprises a satellite number, a satellite elevation angle and a record timestamp, wherein the position information of the ephemeris data record is information about a position where a terminal generating the ephemeris data record is located when the ephemeris data record is generated, and the record timestamp is time when the ephemeris data record is generated.

12. The terminal of claim 10, wherein the processor acquires the target position information of the terminal by:
positioning the terminal in a non-GPS positioning manner to acquire the target position information of the terminal.

13. The terminal of claim 12, wherein the processor acquires the target position information of the terminal by:
in response to failing to position the terminal in the non-GPS positioning manner, acquiring default position information and using the default position information as the target position information of the terminal, wherein
the default position information is externally input position information received by the terminal, or the default position information is position information that is acquired in a positioning process after the GPS module is hot-started and that satisfies a preset condition.

14. The terminal of claim 13, wherein the preset condition comprises position information that is most frequently positioned during a preset time period.

15. The terminal of claim 10, wherein
the processor further is configured to acquire a current target time of the terminal in response to acquiring the target position information of the terminal; and
the processor selects the N satellites according to the ephemeris data record in the target record set to form the visible satellite list by:
classifying ephemeris data records having a same satellite number in the target record set into a subset;
obtaining visible windows of satellites corresponding to satellite numbers in a plurality of subsets according to satellite elevation angles and record timestamps of a plurality of ephemeris data records in the plurality of subsets, wherein each of the visible windows is determined by start time and end time during which the satellite elevation angle is greater than a cut-off angle; and selecting the N satellites from a plurality of satellites to form the visible satellite list, wherein a visible window corresponding to each of the plurality of satellites comprises the target time of the terminal.

16. The terminal of claim 15, wherein the processor selects the N satellites from the plurality of satellites to form the visible satellite list by:

selecting, in descending order of satellite elevation angles in visible windows comprising the target time of the terminal, the N satellites from the plurality of satellites to form the visible satellite list.

17. The terminal of claim 15, wherein the processor obtains the visible windows of the satellites corresponding to the satellite numbers in the plurality of subsets according to the satellite elevation angles and the record timestamps of the plurality of ephemeris data records in the plurality of subsets by:

for each subset, using a record timestamp in a first ephemeris data record that comprises a satellite elevation angle greater than the cut-off angle and that is comprised in the each subset as original start time in time order, and using a record timestamp in a second ephemeris data record that comprises a satellite elevation angle greater than the cut-off angle and that is comprised in the each subset as original end time in the time order; and subtracting first compensation time from the original start time to obtain start time of a visible window of a satellite corresponding to a satellite number in the each subset and subtracting second compensation time from the original end time to obtain end time of the visible window of the satellite corresponding to the satellite number in the each subset, wherein the first compensation time is 2 minutes*a first record entry half-day age value, wherein the first record entry half-day age value is a value obtained by rounding a value that is obtained by dividing a difference between the record timestamp in the first ephemeris data record and the target time of the terminal by 12 hours; and the second compensation time is 2 minutes*a second record entry half-day age value, wherein the second record entry half-day age value is a value obtained by rounding a value that is obtained by dividing a difference between the record timestamp in the second ephemeris data record and the target time of the terminal by 12 hours.

18. The terminal of claim 10, wherein the ephemeris data record further comprises a failure count value; and after positioning according to the satellites in the visible satellite list, the processor is configured to perform:

in response to successful positioning, for an ephemeris data record that corresponds to each satellite of the N satellites in the target record set and that has a current value greater than 0, subtracting 1 from the failure count value; and in response to failed positioning, for an ephemeris data record that corresponds to each satellite of the N satellites in the target record set, adding 1 to the failure count value.

* * * * *